United States Patent
Park et al.

(10) Patent No.: US 7,528,751 B2
(45) Date of Patent: May 5, 2009

(54) SYSTEMS, METHODS, AND APPARATUSES FOR A LONG DELAY GENERATION TECHNIQUE FOR SPECTRUM-SENSING OF COGNITIVE RADIOS

(75) Inventors: Jongmin Park, Atlanta, GA (US); Taejoong Song, Atlanta, GA (US); Kyutae Lim, Alpharetta, GA (US); Chang-Ho Lee, Marietta, GA (US); Jeongsuk Lee, Kyunggi (KR); Kihong Kim, Kyunggi (KR); Seongsoo Lee, Kyunggi (KR); Haksun Kim, Daejeon (KR); Joy Laskar, Marietta, GA (US)

(73) Assignees: Samsung Electro-Mechanics (KR); Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 11/778,557

(22) Filed: Jul. 16, 2007

(65) Prior Publication Data
US 2008/0024336 A1    Jan. 31, 2008

Related U.S. Application Data

(60) Provisional application No. 60/820,751, filed on Jul. 28, 2006.

(51) Int. Cl.
*H03M 1/00* (2006.01)
(52) U.S. Cl. .................. 341/110; 341/155; 341/156
(58) Field of Classification Search .............. 341/110, 341/144, 155, 156; 375/150
See application file for complete search history.

(56) References Cited

U.S. PATENT DOCUMENTS 3,700,876 A * 10/1972 Gray .................... 708/813

5,974,042 A    10/1999 Frank et al.
2002/0141489 A1 * 10/2002 Imaizumi ................ 375/150
2005/0220228 A1    10/2005 Trachewsky et al.

FOREIGN PATENT DOCUMENTS

EP     0266962 B1    5/1988
EP     0266965 A2    5/1988
EP     0602520 A2    6/1994

(Continued)

OTHER PUBLICATIONS

Search Report for GB0714750.7 dated Nov. 24, 2007.

(Continued)

*Primary Examiner*—Jean B Jeanglaude
(74) *Attorney, Agent, or Firm*—Sutherland Asbill & Brennan LLP

(57) ABSTRACT

Embodiments of the invention may provide for a long delay generator for the spectrum sensing of cognitive radio systems. The long delay generator may include an Analog-to-Digital Converter (ADC), memory element, and Digital-to-Analog Converter (DAC). The memory element may utilize shift register bank or Random-Access Memory (RAM) cells. The long delay generator may provide for a selectable delay by digitizing the received signal, delaying the received signal in the digital domain, and reconstructing the delayed signal as an analog. The analog delayed signal may then be compared or otherwise correlated with the original input signal using an analog auto-correlation technique to determine whether a meaningful signal type has been identified or otherwise detected.

30 Claims, 12 Drawing Sheets

FOREIGN PATENT DOCUMENTS

| | | |
|---|---|---|
| EP | 1724595 A1 | 11/2006 |
| GB | 2431548 A | 4/2007 |
| GP | 2431550 A | 4/2007 |
| JP | 2003018116 A | 1/2003 |
| WO | 03036819 A2 | 5/2003 |
| WO | 2007094604 A1 | 8/2007 |

OTHER PUBLICATIONS

French Search Report dated Sep. 17, 2007.

* cited by examiner

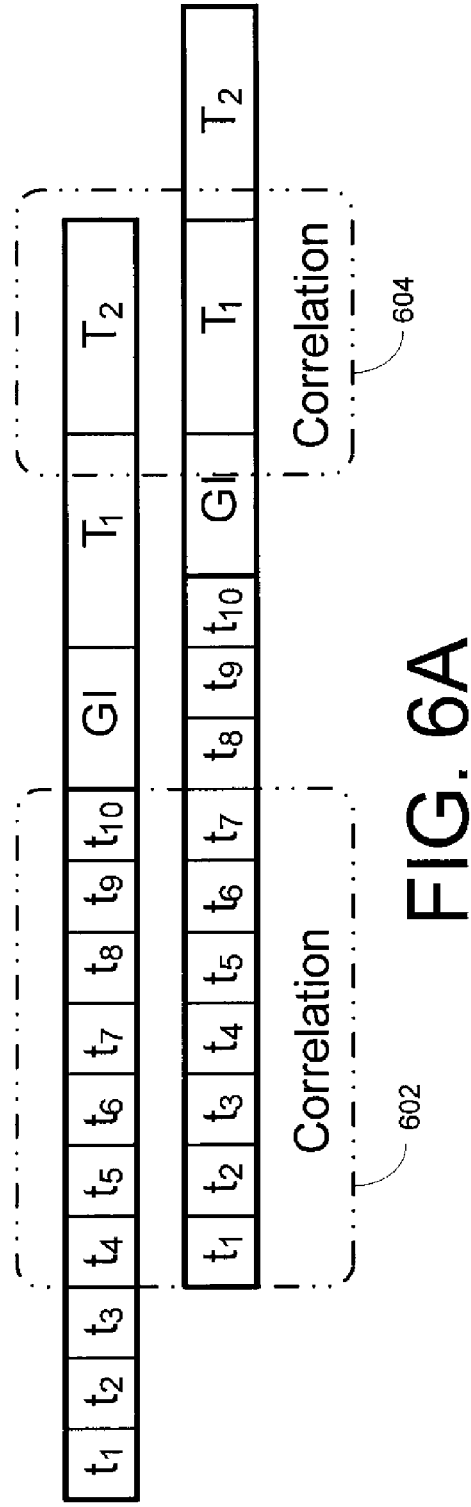
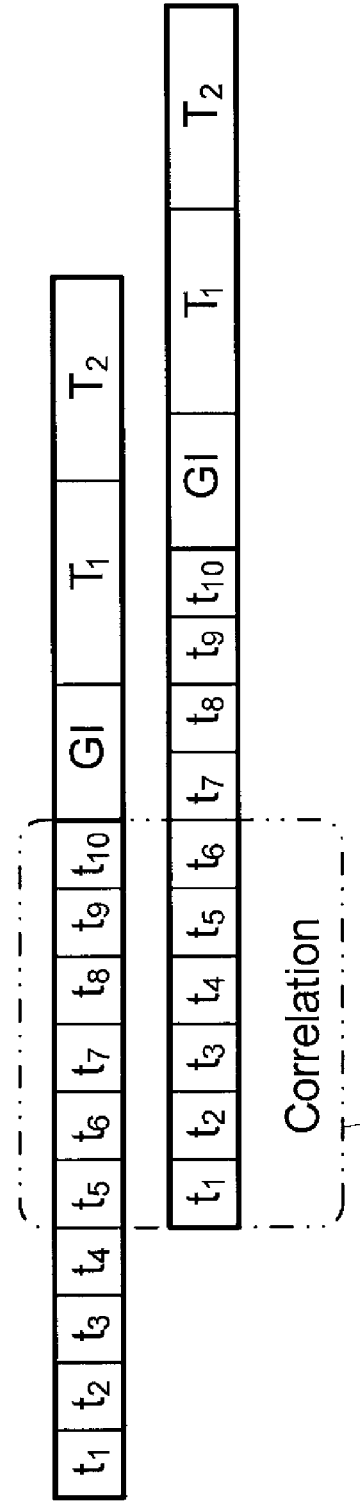
FIG. 6A
FIG. 6B

SYSTEMS, METHODS, AND APPARATUSES FOR A LONG DELAY GENERATION TECHNIQUE FOR SPECTRUM-SENSING OF COGNITIVE RADIOS

RELATED APPLICATION

This application claims priority to U.S. Provisional Ser. No. 60/820,751, entitled "Systems, Methods, and Apparatuses for a Long Delay Generation Technique for Spectrum-Sensing of Cognitive Radios," filed on Jul. 28, 2006, which is incorporated by reference as if fully set forth herein.

FIELD OF THE INVENTION

The present invention relates generally to spectrum sensing for cognitive radios and more particularly to spectrum sensing by using a long delay generation technique for analog auto-correlation (AAC).

BACKGROUND OF THE INVENTION

With the ever-growing need for wireless communications, wireless spectrum resources continue to come under increasing pressure. Recently, cognitive radio (CR) technology has been proposed to increase the efficiency of spectrum utilization by providing for dynamic spectrum resource management. Indeed, such resource management may allow users to use portions of licensed spectrum resources that are not being fully exploited by their primary users at particular times and locations. Accordingly, by adopting dynamic spectrum resource management, the CR system may provide for the use of unoccupied spectrum segments, while guaranteeing the rights of primary users.

In order to allocate unused spectrum resources, the CR systems must include a spectrum sensing technique to accurately and quickly identify the spectrum usage status over a wide frequency range covering various communication standards. Moreover, the spectrum sensing techniques are preferably consume little power and are easy to implement.

Prior spectrum-sensing techniques can generally be categorized into two groups—(1) energy detection and (2) feature detection. However, both of these spectrum sensing techniques are not ideal for use in a CR system. Indeed, energy detection spectrum sensing techniques require careful selection of one or more threshold levels and are oftentimes vulnerable to noise and noise-like broadband digital modulated signals. Likewise, feature detection spectrum sensing techniques require longer processing times, excessive digital hardware resources, and large power consumption.

BRIEF SUMMARY OF THE INVENTION

According to an example embodiment of the invention, there is a method for analog auto-correlation. The method may include providing an analog current input signal, providing an analog delayed signal, where the analog delayed signal lags the analog current input signal by a predetermined time delay, correlating the analog current input signal with the analog delayed signal to generate correlation data, and detecting a signal type based upon the correlation data matching a signature of the signal type, wherein the signature is associated with the predetermined time delay.

According to another embodiment of the invention, there is a system for analog auto-correlation. The system may include an analog current input signal, and a delay generator that provides an analog delayed signal, where the analog delayed signal lags the analog current input signal by a predetermined time delay. The system may also include a multiplier that multiplies the analog delayed signal with the analog current input signal to generate a multiplied output, an integrator that integrates the multiplied output to generate correlation data, and a Medium Access Control (MAC) module that detects a signal type based upon the correlation data matching a signature of the signal type, wherein the signature is associated with the predetermined time delay.

According to yet another embodiment of the invention, there is a system for analog auto-correlation. The system may include means for providing an analog current input signal and means for providing an analog delayed signal, where the analog delayed signal lags the analog current input signal by a predetermined time delay. The system may also include means for correlating the analog current input signal with the analog delayed signal to generate correlation data, and means for detecting a signal type based upon the correlation data matching a signature of the signal type, wherein the signature is associated with the delay time period.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 6A and 6B illustrates analog auto-correlation associated with detecting a WLAN 802.11a signal, according to an example embodiment of the invention.

DETAILED DESCRIPTION OF THE INVENTION

The present invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Example embodiments of the invention may provide for an analog auto-correlation (AAC) technique for detecting or determining whether one or more spectrums are currently occupied. According to an example embodiment of the invention, the AAC technique may involve comparing a received signal to a delayed signal to determine correlation data. The correlation data may then be used by the AAC technique to determine whether a meaningful signal has been detected. If a meaningful signal has been detected, then the AAC technique may determine that the spectrum associated the received signal is currently occupied. It will be appreciated that one or more portions AAC technique may be performed in the analog domain in order to provide for low-power operation and real-time computation.

As introduced above, the AAC technique may rely upon delaying one or more received signals according to a delay function. In implementing the delay function for use with the AAC technique, example embodiments of the invention may provide for a long delay generator. The long delay generator in accordance with example embodiments of the invention may provide for one or more delays in the digital domain without loss of the auto-correlation property of the signal. Generally, the long delay generator may include one or more analog-to-digital converters (ADC), memory elements, and digital-to-analog converters (DAC). The memory element may be implemented with shift register bank or Random-Access-Memory (RAM) cells.

The long delay generator in accordance with an embodiment of the invention may provide for delay in the digital domain. By delaying the received signals in the digital domain, the signal quality of the delayed signal is not impacted by the length of the delay. Indeed, whether the delay is for a shorter or longer time period, the quality of the delayed signal is generally impacted only by its conversion from the analog to digital domain and from the digital domain back to the analog domain. Therefore, the delay provided by the long delay generator may be selected without corrupting the integrity of the received signal. According to an example embodiment of the invention, the minimum achievable delay step may be determined by the clock speed of the memory element while the maximum achievable delay step may be determined by the size of the memory element.

Figure 1:
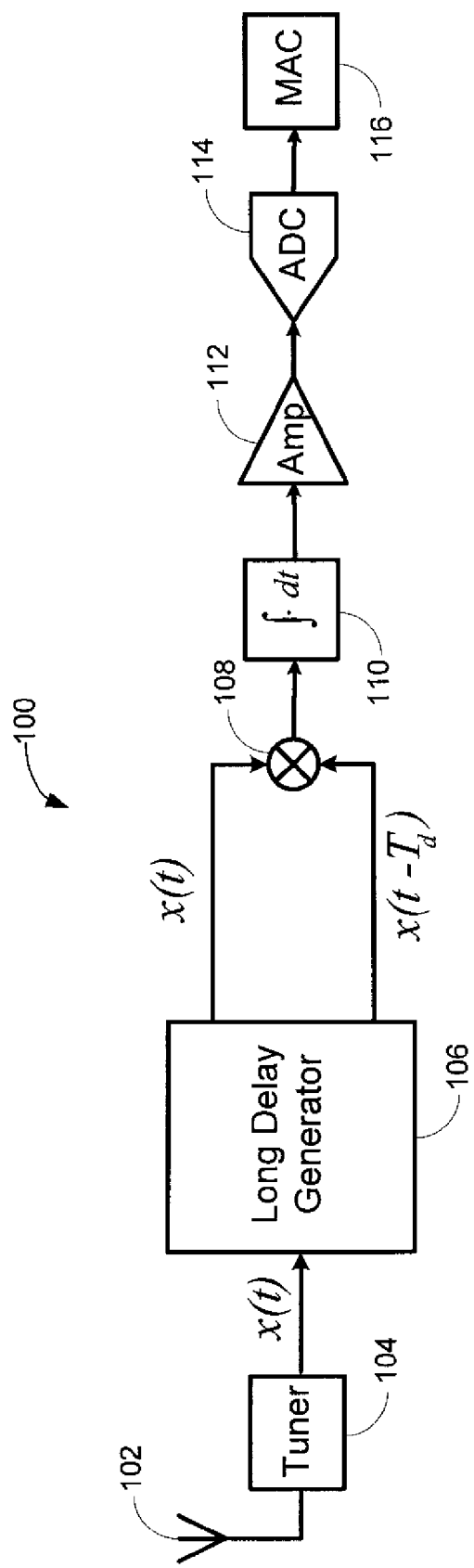
FIG. 1 illustrates an operating environment for implementing an analog auto-correlation (AAC) for determining meaningful signal reception, according to an example embodiment of the invention.

FIG. 1 illustrates components of an AAC system 100 that includes an antenna 102, a tuner 104, and a long delay generator 106, a multiplier 108, an integrator 110, an amplifier 112, an analog-to-digital converter (ADC) 114, and a Medium Access Control (MAC) module 116.

Figure 2:
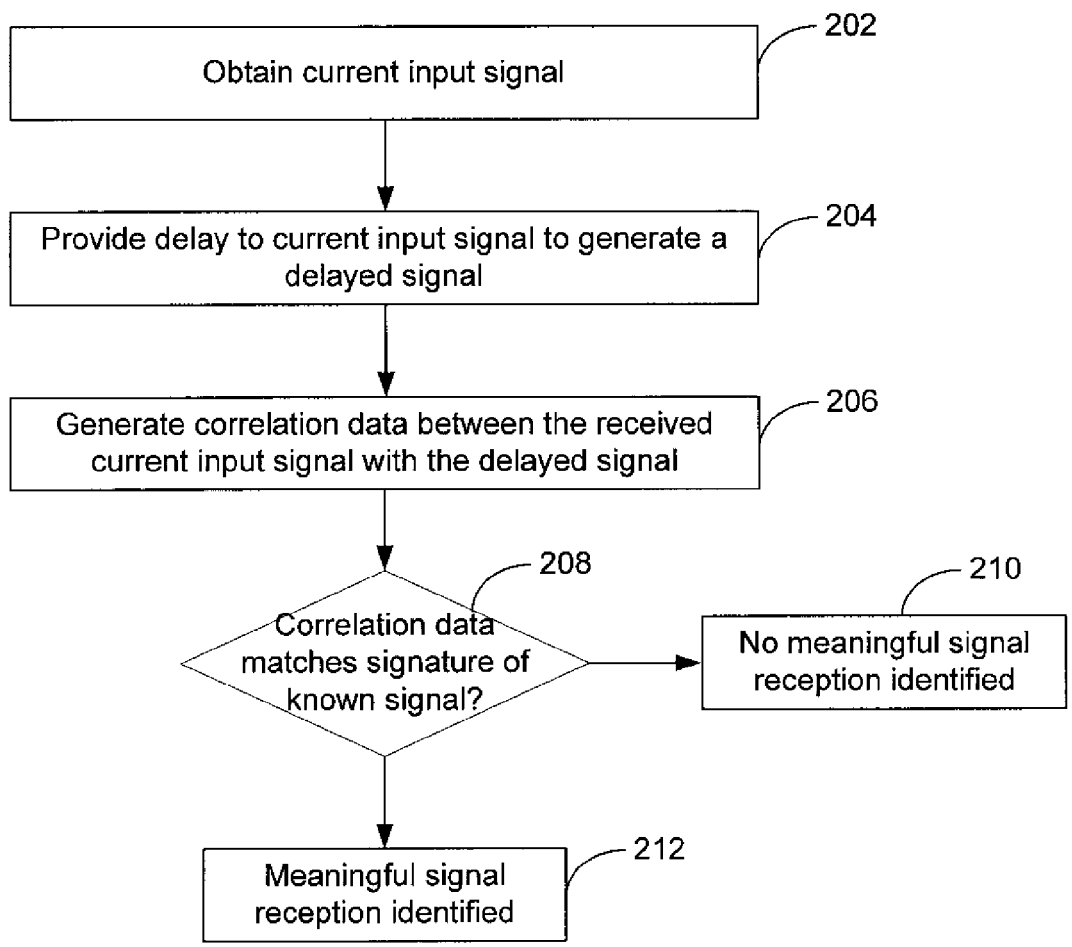
FIG. 2 illustrates a long delay generator implemented with a shift register bank, according to an example embodiment of the invention.

The operation of the AAC system 100 will now be discussed in conjunction with FIGS. 1 and 2. At step 202, a current input signal x(t) may be obtained from the antenna 102 and the tuner 104. More specifically radio frequency (RF) signals may first be received by the antenna 102. The antenna 102 may be a wideband, omni-directional antenna operable over a wide frequency range, perhaps from several megahertz (MHz) to the multi-gigahertz (GHz) range, according to an example embodiment of the invention. The RF signals received by the antenna 102 may be provided to the tuner 104, which processes received RF signals and outputs the current input signal x(t).

According to an embodiment of the invention, the tuner 104 may be a radio frequency (RF) receiver that filters the received RF signal to a particular spectrum segment. The bandwidth of the spectrum segment may be in the several MHz range, although alternative bandwidth sizes may be utilized without departing from embodiments of the invention. The tuner 104 may also down-convert the filtered signal, perhaps in the several MHz range, in order to relax the operating requirements of the long delay generator 106. After performing the above-described filtering and/or down-conversion, tuner 104 may output the current input signal x(t).

As illustrated by step 204, the current input signal x(t) may be delayed using a long delay generator 106. In particular, the current input signal x(t) may be provided with a certain delay time period or value $T_d$. The delay value $T_d$ provided by the long delay generator 106 may be a predetermined and unique value associated with one or more periodic signal formats. As will be described in further detail below, the long delay generator 106 may delay the current input signal x(t) according to the delay value $T_d$ in the digital domain. However, the long delay generator 106 may output the delayed signal $x(t-T_d)$ in the analog domain.

In step 206, in accordance with the analog auto-correlation technique, the current input signal x(t) may be compared or correlated with the delayed signal $x(t-T_d)$ to generate correlation data. More specifically, the analog auto-correlation between the original input signal x(t) and the corresponding delayed signal $x(t-T_d)$ may be performed by multiplying these two signals with an analog multiplier 108 and integrating the resulting product with an analog integrator 110 to generate the analog correlation data. The analog integrator 110 may be a sliding-window integrator according to an example embodiment of the present invention. The analog correlation data provided at the output of the integrator 110 may be then be amplified by the amplifier 112 and digitized by Analog-to-Digital Converter (DAC) 114.

In step 208, the digitized correlation data may then be examined by a Medium Access Control (MAC) module 116. In particular, the MAC module 116 may determine whether the digitized correlation data matches a signature of a known signal or signal type associated with the delay value $T_d$. For example, the MAC module 116 may determine whether the digitized correlation data exceeds one or more thresholds. If the MAC module 116 determines that the digitized correlation data does not match a signature of a known signal or signal type, then the MAC module 116 may determine that no meaningful signal has been detected or identified in the current input signal x(t), as illustrated by step 210.

On the other hand, the MAC module 116 may determine that the digitized correlation data matches a signature of a known signal or signal type. For example, the digitized correlation data may exceed one or more thresholds. In this situation, the MAC module 116 may determine that the received input signal is a meaningful signal, as illustrated by step 212. According to an embodiment of the invention, the MAC module 116 may also identify or otherwise provide an indication of the received input signal and/or the type of received input signal.

As described above in step 204, in generating the delayed signal $x(t-T_d)$, the long delay generator 106 may utilized quantization and regeneration. It will be appreciated that the non-delayed signal—that is, the current input signal x(t)—may optionally be quantized and regenerated (but not delayed by any delay value $T_d$), perhaps also by the long delay generator 106. By doing so, the quality of both signals may be equivalent, increasing the possibility of auto-correlation. Furthermore, the inherent delay involved in quantizing and regeneration of the delayed signal delayed signal $x(t-T_d)$ will likewise be automatically provided to the current input signal x(t), thereby eliminating the need for a sophisticated timing control block that accounts for the inherent delays in quantization and regeneration.

Figure 3:
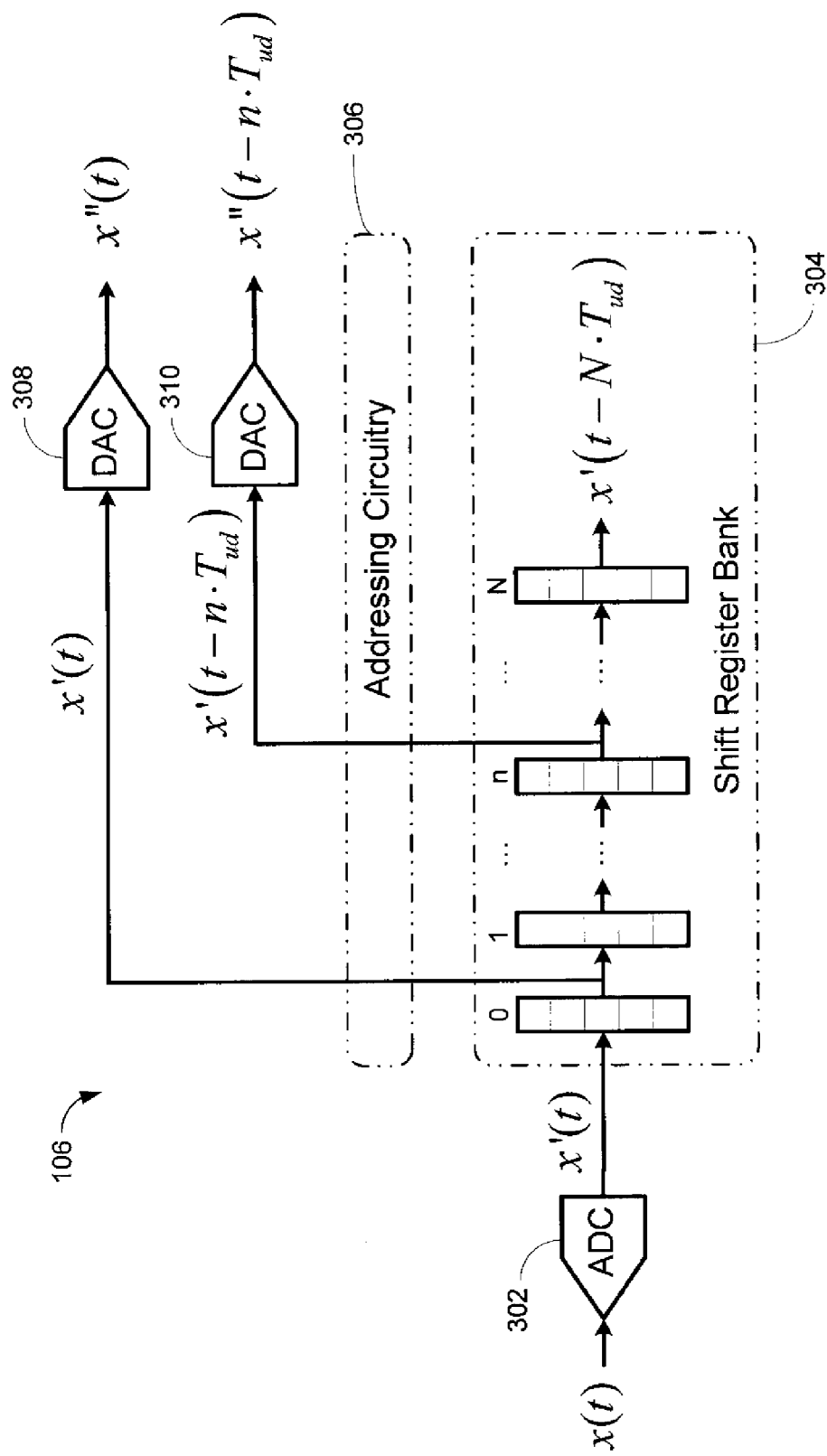
FIG. 3 illustrates a long delay generator implemented with Random-Access-Memory (RAM) cells, according to an example embodiment of the invention.

A long delay generator using shift register bank According to an embodiment of the invention, a long delay generator 106 of FIG. 1 may be implemented using a shift register bank. As illustrated by FIG. 3, the long delay generator 106 may include an analog-to-digital converter (ADC) 302, a shift register bank 304, addressing circuitry 306 in communications with the shift register bank 304, and two or more digital-to-analog converters (DACs) 308, 310.

As described above with respect to FIG. 1, the current input signal x(t) may have been down-converted and band-limited by the preceding tuner 104. Thus, the operating requirement, including the sampling frequency, of the ADC 302 in FIG. 3 may be relaxed. Indeed, the sampling frequency of ADC 302 $f_s$ may determine the unit delay $T_{ud}$ of the shift register bank 304. The resolution of ADC 302 may be equal to the bit-width of the shift register bank 304 and the resolution of the DACs 308, 310.

Still referring to FIG. 3, the current input signal x(t) may be sampled and digitized with the ADC 302 in accordance with a clock signal, perhaps at every clock rising or falling edge, thereby producing a digitized current input signal x'(t). The digitized current input signal x'(t) may then be stored in a first column/register (0) of the shift register bank 304. At every clock signal, perhaps at the rising or falling edge, the shift register bank 304 may move or shift the data from the preceding column/register to the next column/register. Consequently, at time t, shift register bank 304 may store the current input signal x'(t) at the 0th column/register, a first delayed signal $x'(t-T_{ud})$ at the first column/register, a second delayed signal $x'(t-2T_{ud}$ at 2nd column/register, a third delayed signal $x'(t-3T_{ud})$ at 3rd column/register, and the like, where $T_{ud}$ is the until delay provided by each column/register of the shift register bank 304. If the desired delay is $T_d$, then the desired output may be at column/register n, where $n=T_d/T_{ud}$. Accordingly, the delayed signal at an nth column/register of the shift register bank 304 may be $x'(t-n \cdot T_{ud})$.

Once the desired column/register n has been determined, the addressing circuitry 306 may select the digitized delayed signal $x'(t-n \cdot T_{ud})$ from the nth column/register as input to the DAC 310 for regeneration to an analog delayed signal $x''(t-n \cdot T_{ud})$. Likewise, the digitized current input signal x'(t) output from the 0th column/register may be provided to the DAC 308 for regeneration to an analog delayed signal x''(t). Therefore, the outputs of the long delay generator 106 may be the regenerated current input signal x''(t) and the delayed input signal $x''(t-n \cdot T_{ud})$. By using two substantially identical DACs 308, 310, which will be triggered with the same clock signal, the quality of the regenerated signals x''(t) and $x''(t-n \cdot T_{ud})$ may be equivalent each other, thus minimizing the effect that the DACs 308, 310 have on the subsequent analog auto-correlation calculation.

It will be appreciated that the long delay generator 106 implemented with a shift register bank 304 may utilize relatively simplistic addressing circuitry 306. For example, as shown by FIG. 3, the shift register bank 304 may not require input addressing because the input for the long delay generator 106 may always be provided to the 0th column/register of the shift register bank 304. Moreover, the input of a first DAC 308 may be hard-wired to the output of the 0th column/register of the shift register bank 304. The addressing circuitry 306 may then choose the input of a second DAC 310 among N outputs of each column/register.

Figure 4:
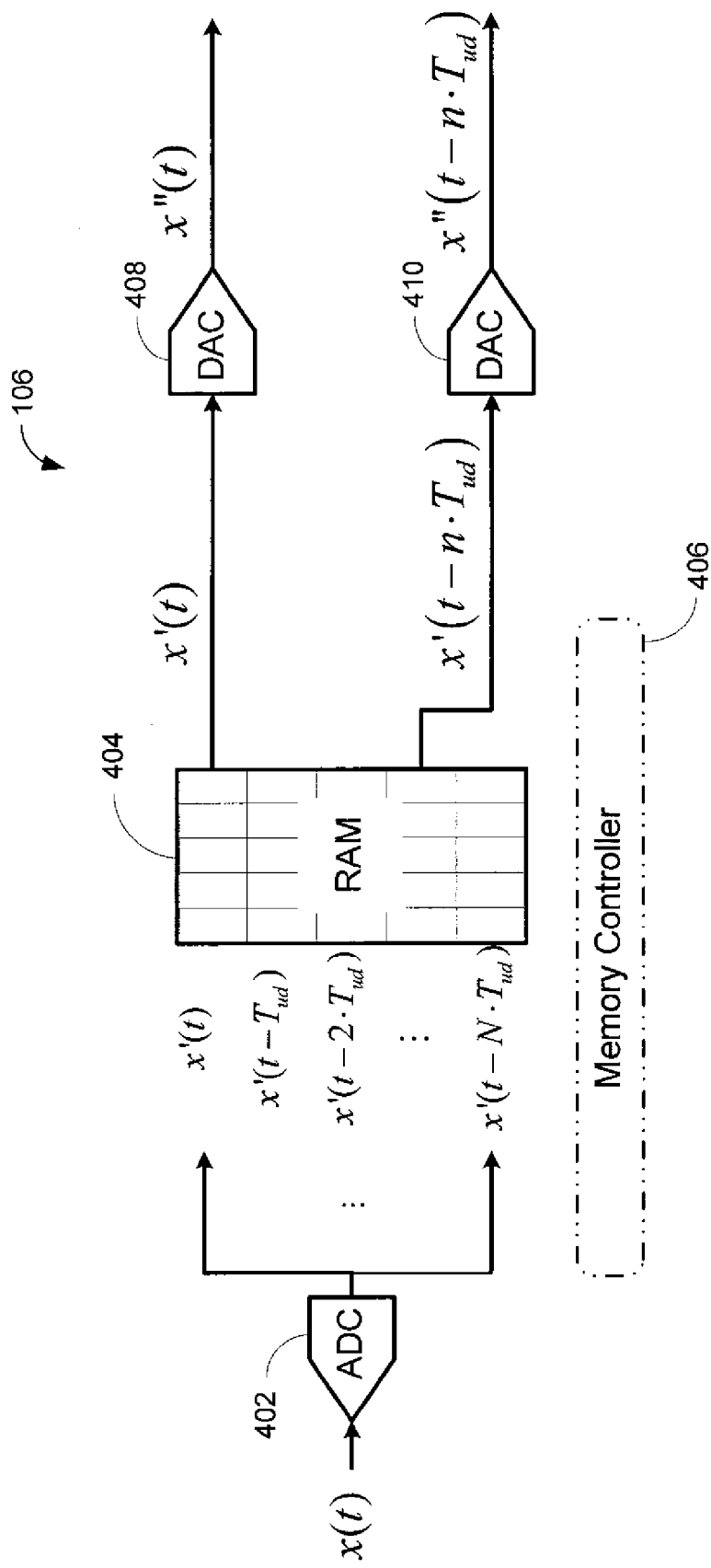
FIG. 4 illustrates an example method for spectrum sensing using analog auto-correlation (AAC), according to an example embodiment of the invention.

A long delay generator using RAM. According to an embodiment of the invention, a long delay generator 106 of FIG. 1 may alternatively be implemented using random access memory (RAM). As illustrated by FIG. 4, the long delay generator 106 may include an analog-to-digital converter (ADC) 402, RAM 404, memory controller 406 in communications with the RAM 404, and two or more digital-to-analog converters (DACs) 408, 410.

As described above with respect to FIG. 1, the current input signal x(t) may have been down-converted and band-limited by the preceding tuner 104. Thus, the operating requirement, including the sampling frequency, of the ADC 402 in FIG. 4 may be relaxed. Indeed, the sampling frequency of ADC 402 $f_s$ may determine the unit delay $T_{ud}$ of the shift register bank 404. The resolution of ADC 402 may be equal to the bit-width of the shift register bank 404 and the resolution of the DACs 408, 410.

Still referring to FIG. 4, the current input signal x(t) may be sampled and digitized with the ADC 402 in accordance with a clock signal, perhaps at every clock rising or falling edge, thereby producing a digitized current input signal x''(t). The digitized current input signal x''(t) may then be stored in an arbitrary row of RAM 404, which may be determined by the memory controller 406. At every clock signal, perhaps at the rising or falling edge, the memory controller 406 may determine the next storage position, that is, the row address for next row of RAM 404. For example, the memory controller 406 may start with the bottom row (e.g., row 0) of RAM 404 and simply increase the row address in a sequential manner, as shown in FIG. 4. Consequently, at time t, RAM 404 may have stored the current input signal x'(t) at the 0th row, the first delayed signal $x''(t-T_{ud})$ at the first row, the second delayed signal $x'(t-2T_{ud})$ at the second row, the third delayed signal $x'(t-3T_{ud})$ at the third row, and the like, where $T_{ud}$ is the unit delay of each row of the RAM 404. If the desired delay is $T_d$, then the desired row address of the output may be at row n, where $n=T_d/T_{ud}$. Accordingly, the delayed signal a the nth row of the of the RAM 404 may be $x'(t-n \cdot T_{ud})$. It will be appreciated however that the memory controller 406 may also determine the next storage position in a non-contiguous or non-sequential row of RAM 404 without departing from embodiments of the invention.

Once the desired row n is calculated, the memory controller 406 may select the digitized delayed signal $x'(t-n \cdot T_{ud})$ from the nth row as input to the DAC 410 for regeneration to an analog delay signal $x''(t-n \cdot T_{ud})$. Likewise, the digitized current input signal x'(t) output from the 0th row may be provided to the DAC 408 for regeneration to an analog delayed signal x''(t). Therefore, the outputs of the long delay generator 106 may be the regenerated current input signal x''(t) and the delayed input signal $x''(t-n \cdot T_{ud})$. By using two substantially identical DACs 408, 410, which will be triggered with the same clock signal, the quality of the regenerated signals x''(t) and $x''(t-n \cdot T_{ud})$ may be equivalent each other, thus minimizing the effect that the DACs 408, 410 have on the subsequent analog auto-correlation calculation.

It will be appreciated that a long delay generator 106 implemented using RAM 404 may be a smaller size than one implemented using a shift register bank 304. Indeed, the unit storage element of RAM 304 may occupy a small area and consume less power than a shift register bank 204.

Figure 5:
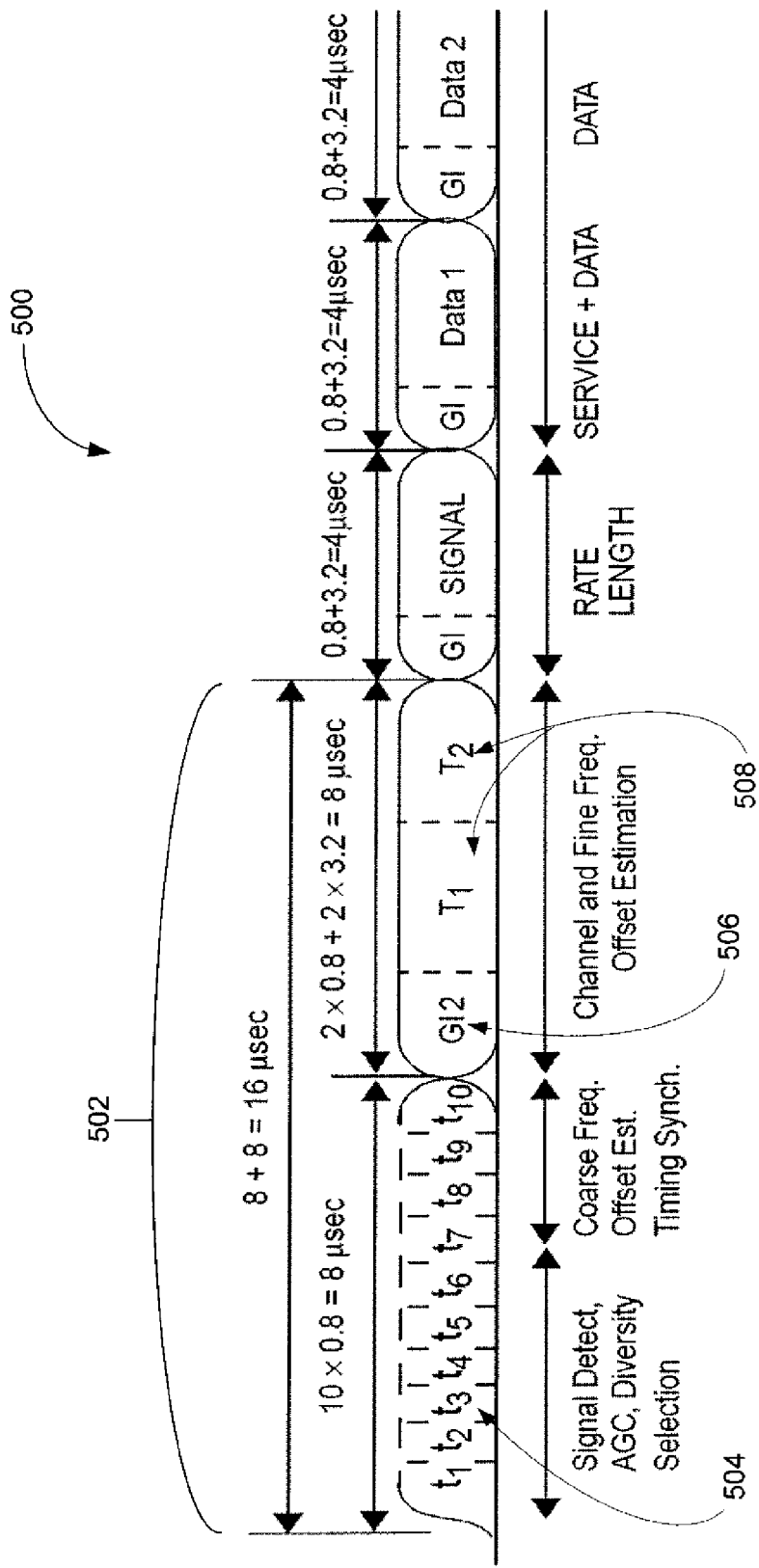
FIG. 5 illustrates an example frame structure of an WLAN standard 802.11a signal, according to an example embodiment of the invention.
Figure 7A:
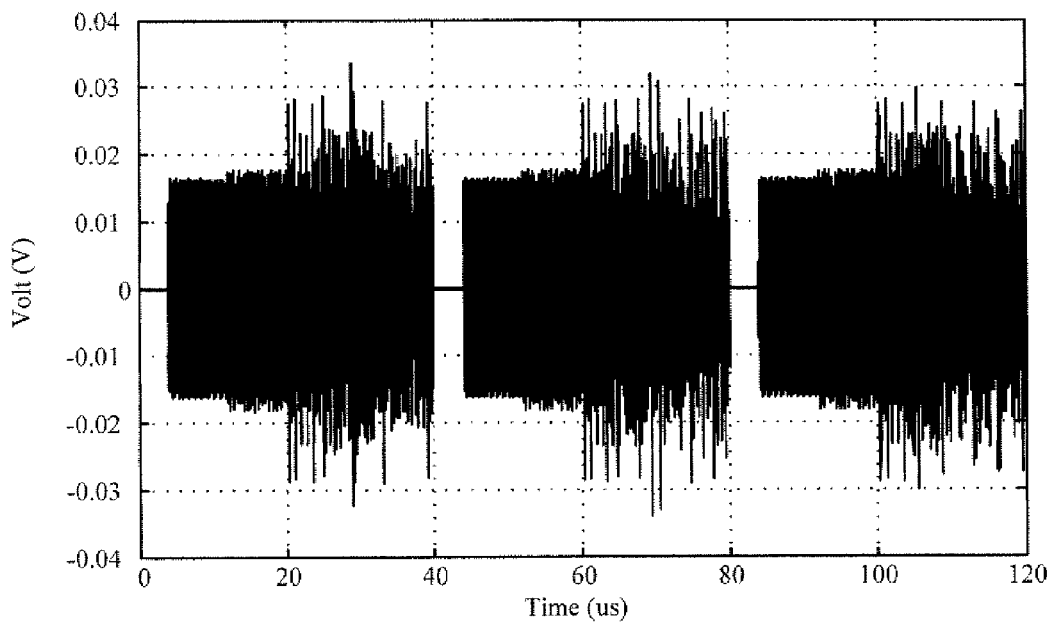
FIGS. 7-9 illustrate simulations of the analog auto-correlation with various delays, according to an example embodiment of the invention.
Figure 7B:
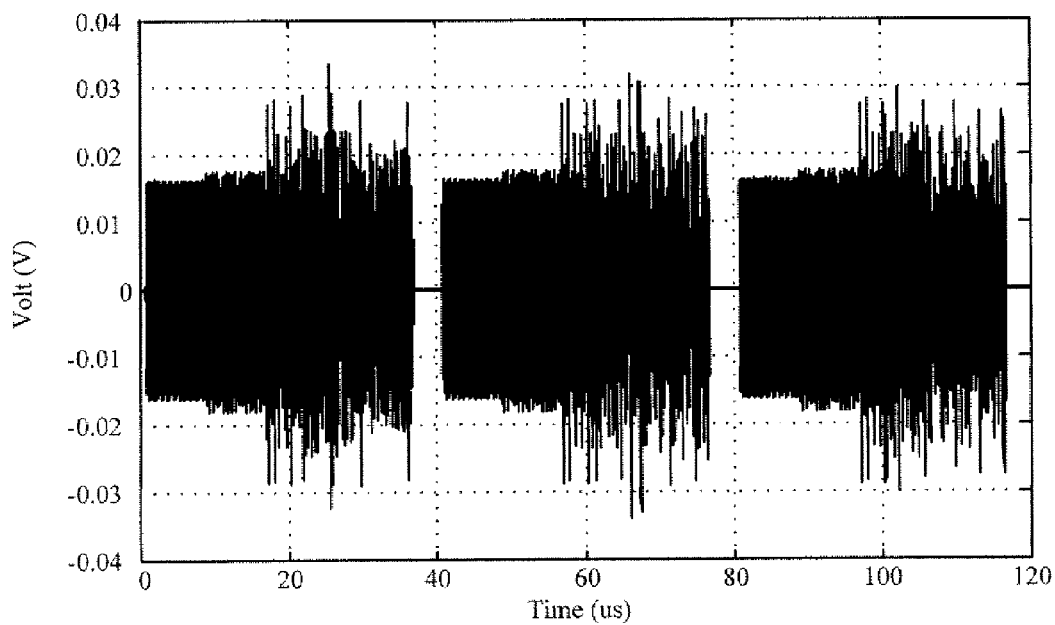
Figure 7C:
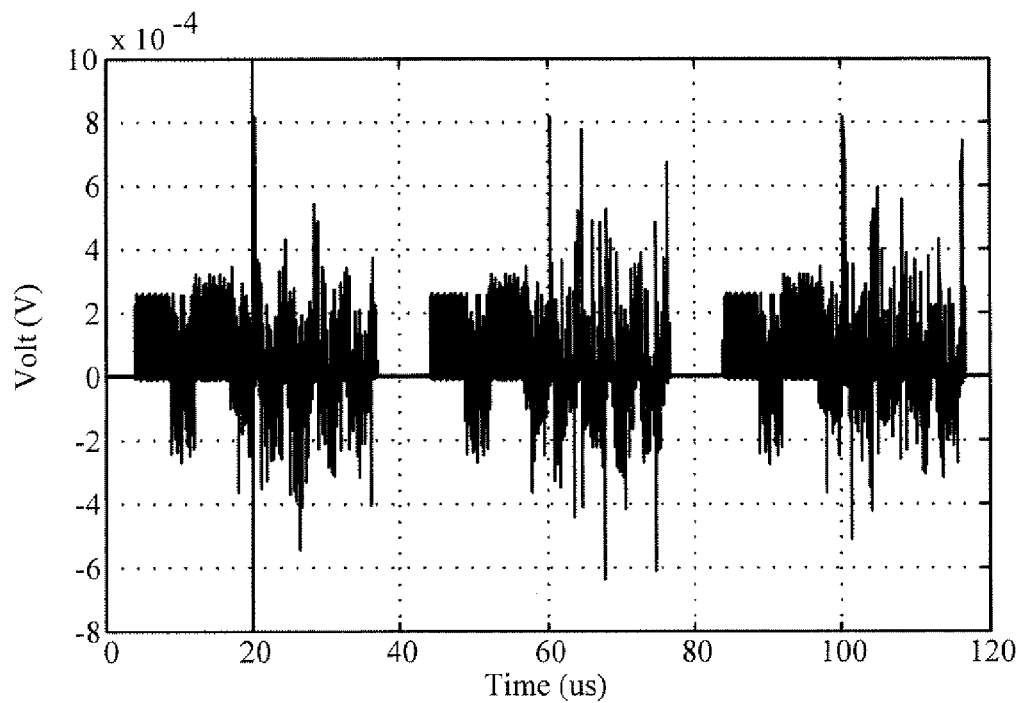
Figure 7D:
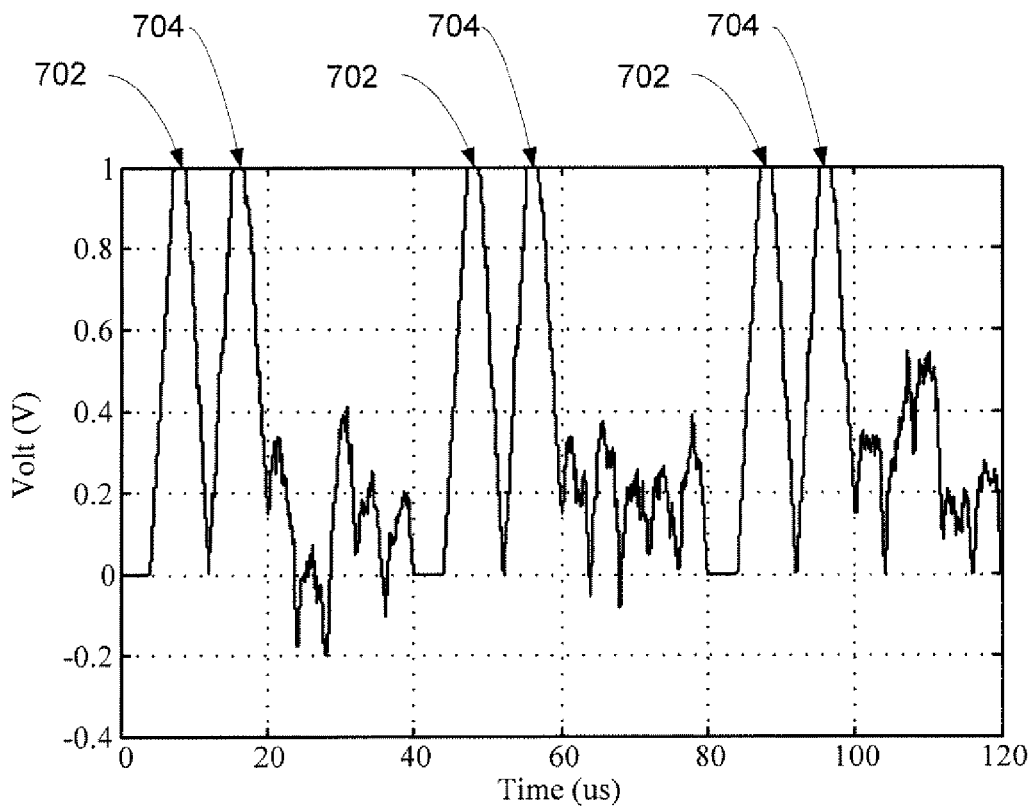
Figure 8A:
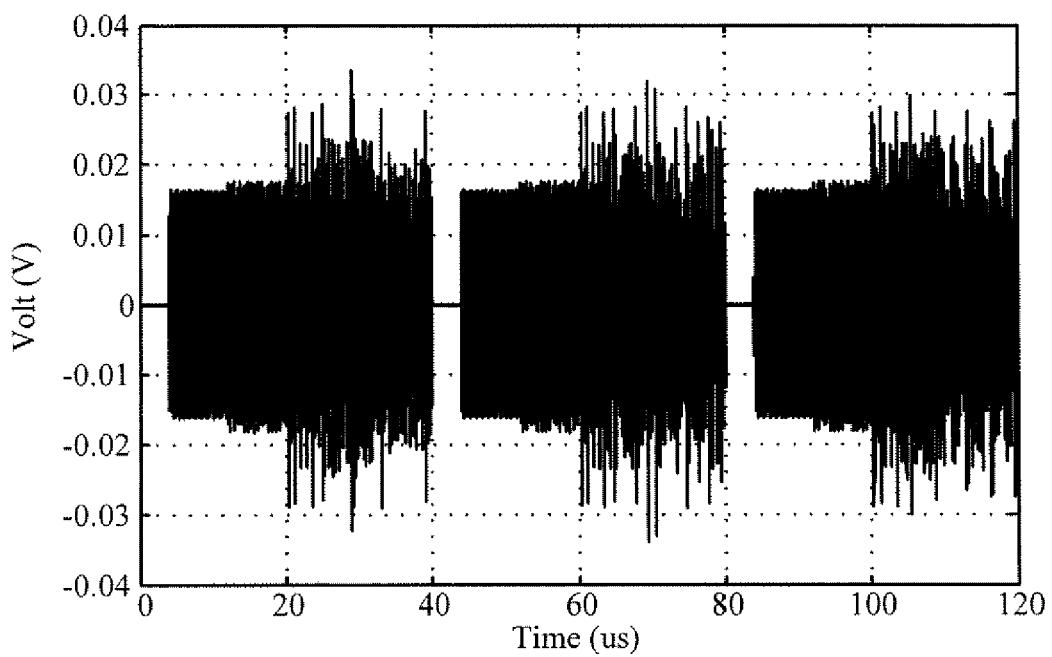
Figure 8B:
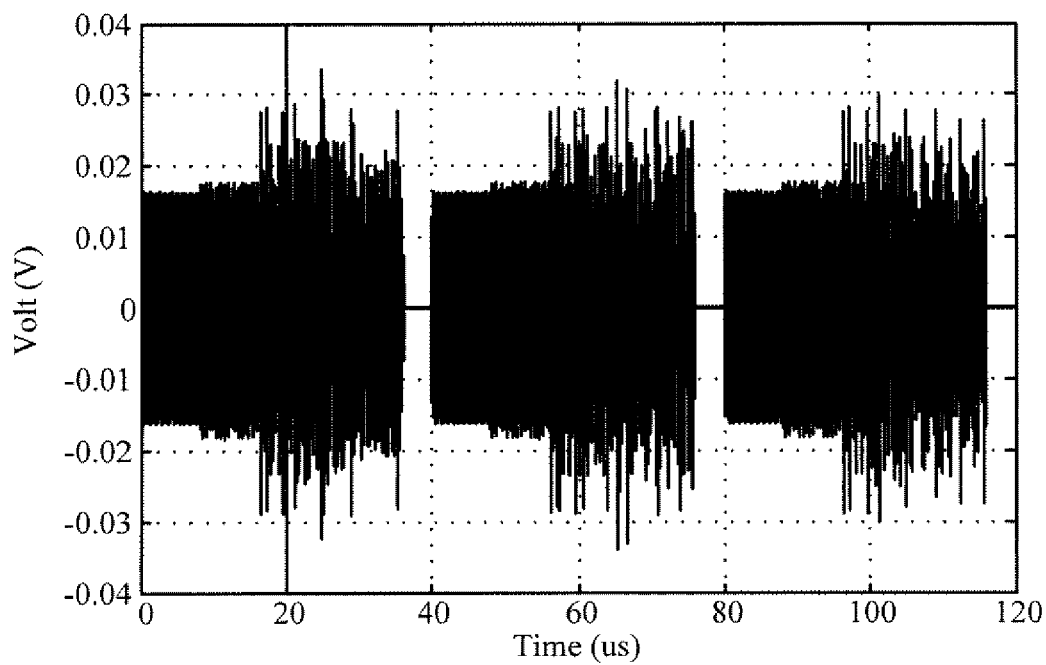
Figure 8C:
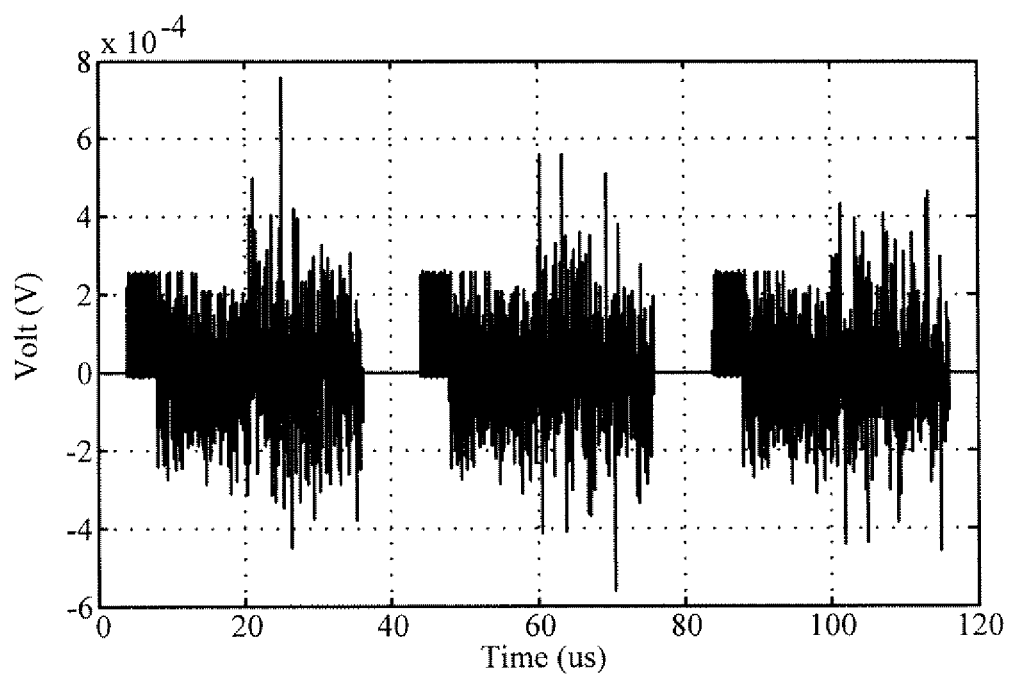
Figure 8D:
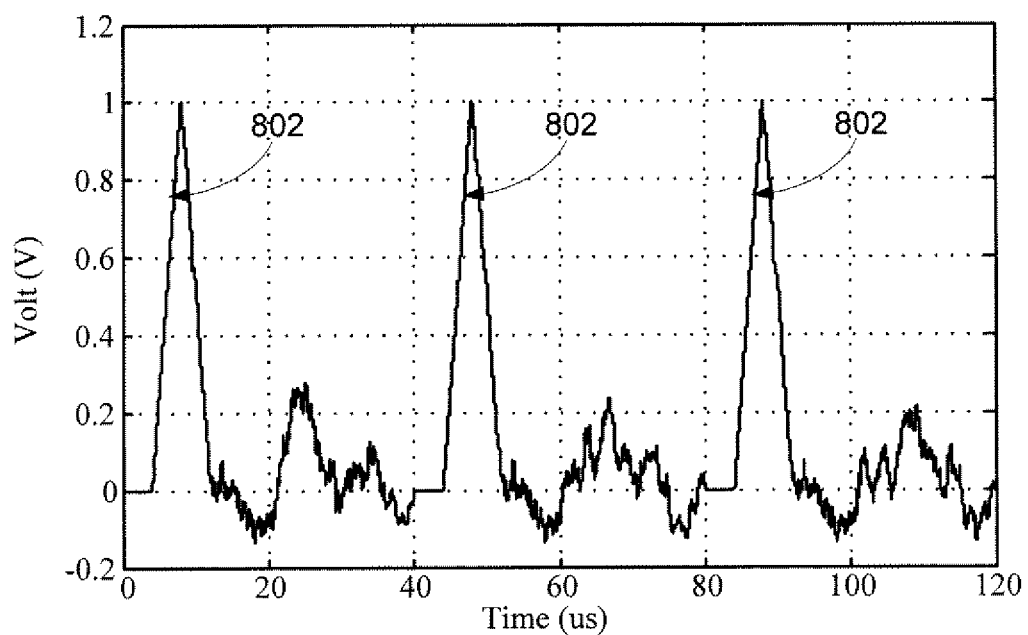

Example Embodiment of AAC using an IEEE 802.11 signal. According to an example embodiment of the invention, an analog auto-correlation (AAC) technique may be used with the long delay generator 106 may be simulated for a variety of signal types. According to an example signal type, a standard IEEE 802.11a—Orthogonal Frequency Division Multiplexing (OFDM) signal may have synchronization preambles 502 at the beginning of a frame structure 500, as shown in FIG. 5. The preamble of the IEEE 802.11a signal type may include short preambles 504, guard intervals 506, and long preambles 508. Short preambles 504 may include ten identical preambles ($t_1$~$t_{10}$), each lasting 0.8 microseconds (usec). Guard intervals 506 may include two 0.8 usec signals. Long preambles 508 may include two identical signals ($T_1$~$T_2$), each lasting 3.2 usec. In FIG. 5, the suitable delay amount $T_d$ in case of 802.11a may be multiples of 0.8 usec.

As an example, FIG. 6A illustrates a comparison between a current input IEEE 802.11a signal x''(t) and a delayed IEEE 802.11 signal x"(t–$T_d$), when the time delay $T_d$ is 3.2 usec. In this case, the auto-correlation may have two high correlation data values, one due to the correlation of six short preambles 602 and another due to the correlation of a long preamble 604. It will be appreciated that the correlation data may be obtained by multiplying the 802.11a signal x"(t) and a delayed IEEE 802.11 signal x"(t–$T_d$) using a multiplier 108 and integrating the result with the integrator 110. On the other hand, FIG. 6B illustrates a comparison a comparison between a current input x"(t) signal and a delayed signal x"(t–$T_d$), when the time delay $T_d$ is 4.0 usec. In this case, the auto-correlation may have one high value due to the correlation of seven short preambles 610. Therefore, if the result of AAC has two high values with the delay of 3.2 usec and one high value with the delay of 4.0 usec, the received signal may be identified as 802.11a. In other words, the delay of 3.2 usec and 4.0 usec may be a signature of 802.11a signal.

The following example simulation results shown in FIGS. 7-9 may be applicable to long delay generators 106 implemented either with a shift register bank 304 or RAM 404. The input to the long delay generator 106 may be set to an IEEE 802.11a signal centered at 40 MHz. The idle interval for the IEEE 802.11a signal may be set to 4.0 usec with guard interval 506 of 0.25 usec. The data in the IEEE 802.11a signal may be modulated with 64 Quadrature Amplitude Modulation (64 QAM). For purposes of the simulation results in FIGS. 7-8, the tuner 104, multiplier 108, and the integrator 110 were assumed to be ideal. Likewise, the resolution and bit-width of ADC 302, 402, shift register bank 304 or RAM 404, and DACs 308, 310 or 408, 410 were assumed to be infinite.

FIG. 7 illustrates the AAC simulation result when the delay $T_d$ is set to 3.2 usec. More specifically, FIG. 7A illustrates the current input signal x"(t) containing three frames of the IEEE 802.11a signal. FIG. 7B illustrates the delayed signal of FIG. 7A, which is the delayed output x"(t–$T_d$) of the long delay generator 106. FIG. 7C illustrates the output of multiplying the current input signal x"(t) with the delayed signal x"(t–$T_d$) by the multiplier 108. FIG. 7D illustrates the correlation data generated by integrating the output of the multiplier 108 with the integrator 110. As shown in FIG. 7D, the correlation data may provide that each frame has two high peaks 702, 704. Accordingly, by setting a threshold value of around 0.6V, a signature of having two peaks with 3.2 usec delay may be acquired, and an 802.11a signal may be identified based upon the signature.

FIG. 8 illustrates the AAC simulation result when delay time $T_d$ is set to 4.0 usec. More specifically, FIG. 8A illustrates a current input signal x"(t) containing three frames of 802.11a. FIG. 8B illustrates the delayed signal of FIG. 7A, which is the delayed output x"(t–$T_d$) of the long delay generator 106. FIG. 8C illustrates the output of multiplying the current input signal x"(t) with the delayed signal x"(t–$T_d$) by the multiplier 108. FIG. 8D illustrates the correlation data generated by integrating the output of the multiplier 108 with the integrator 110. As shown in FIG. 8D, the correlation data may provide that each frame has a high peak 802. Accordingly, by setting a threshold value of around 0.6V, a signature of having thus by setting the threshold around 0.6, a signature of having one peak with a 4.0 usec delay may be acquired, and an 802.11a signal may be identified based upon the signature.

FIG. 9 illustrates the AAC simulation result when using a long delay generator without high-performance building blocks. More specifically, in the simulation of FIG. 9, the delay time $T_d$ is set to 4.0 usec, the sampling frequency of ADC 202, 302 and DAC 208, 210, 308, 310 is set to 320 MHz, and the resolution of ADC 202, 302 and DAC 208, 210, 308, 310 and the bit-width of shift registers 204 or RAM 304 are set to 5 bits. In this simulation, the antenna 102, tuner 104, multiplier 108, and integrator 110 are assumed to be ideal.

Figure 9A:
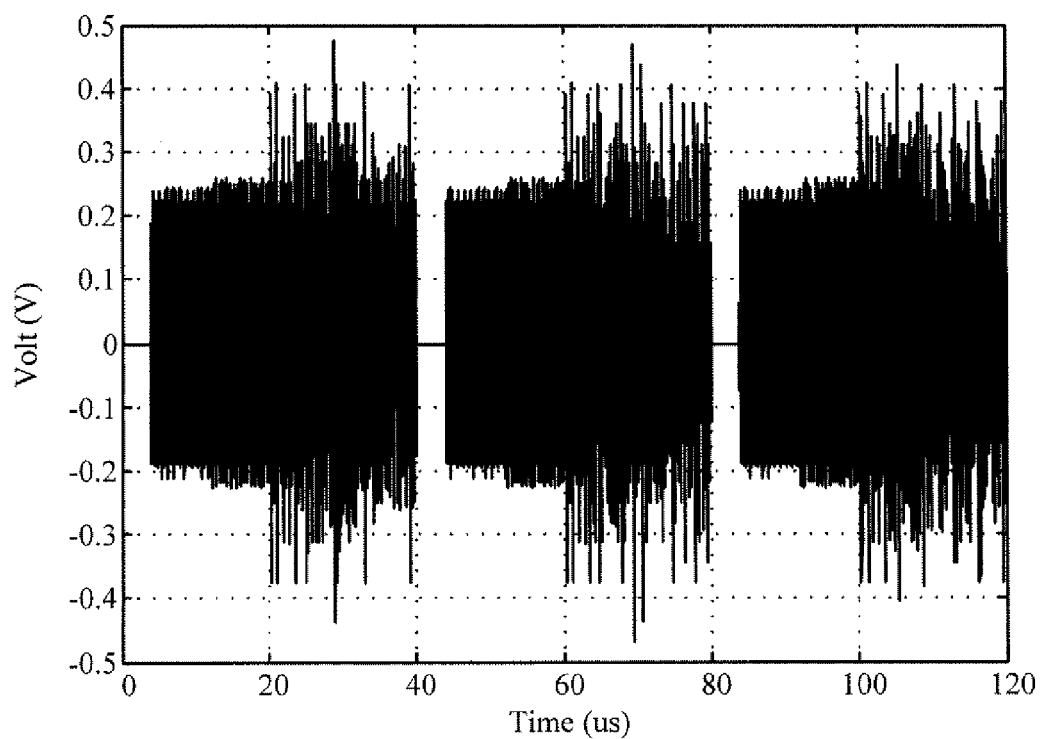
Figure 9B:
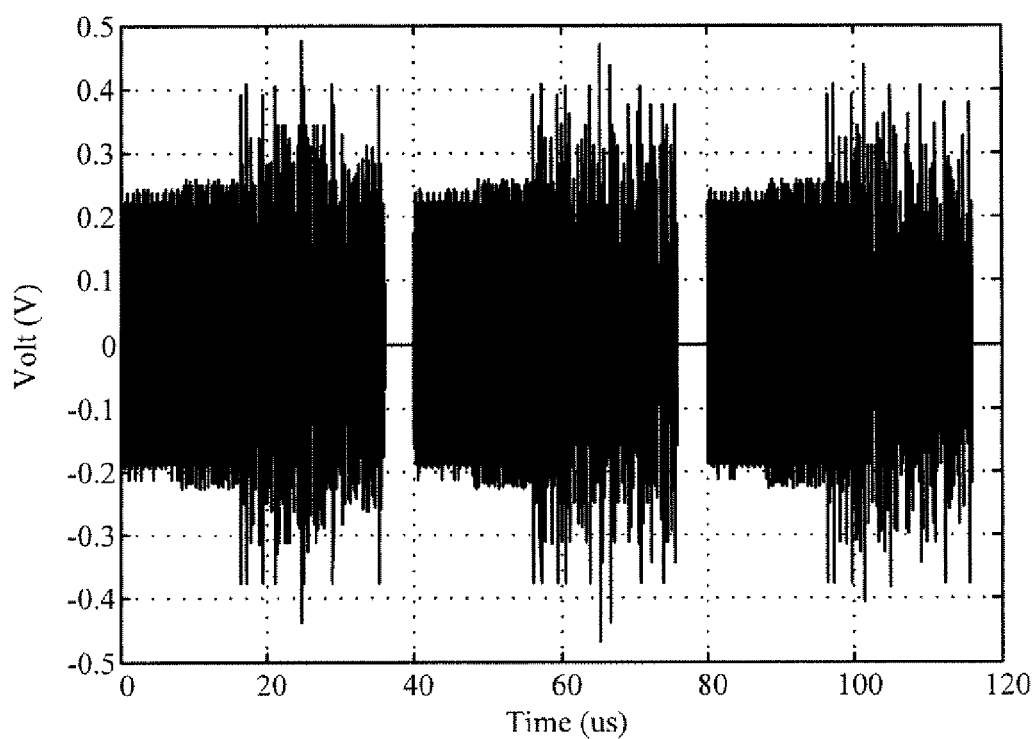
Figure 9C:
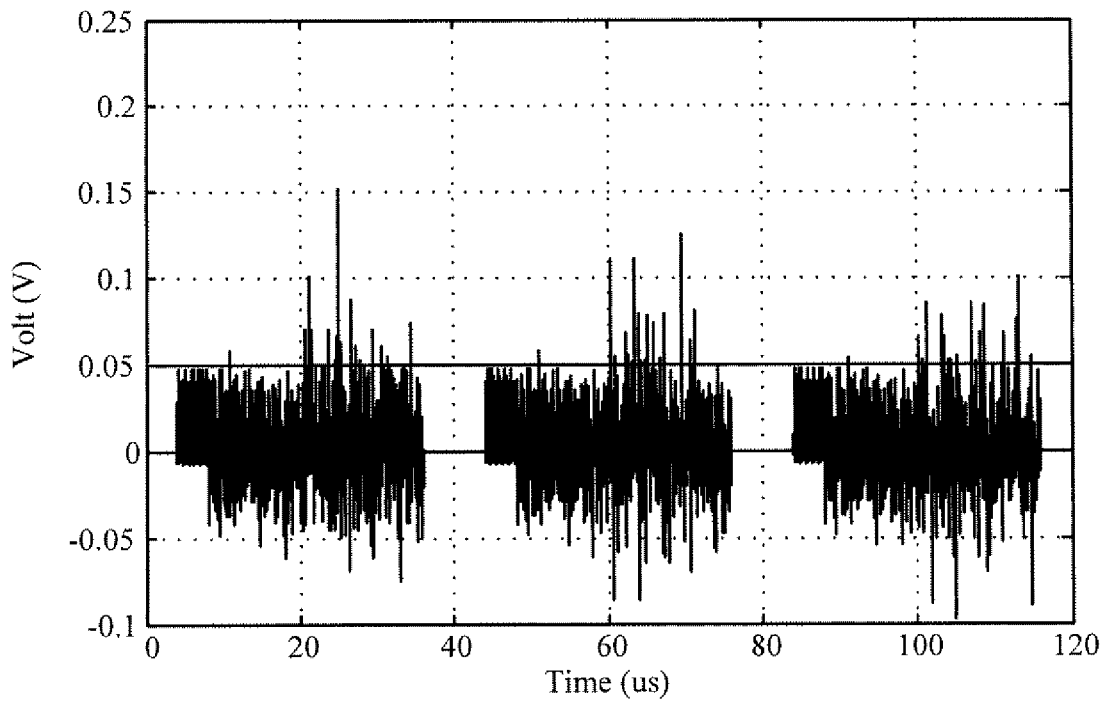
Figure 9D:
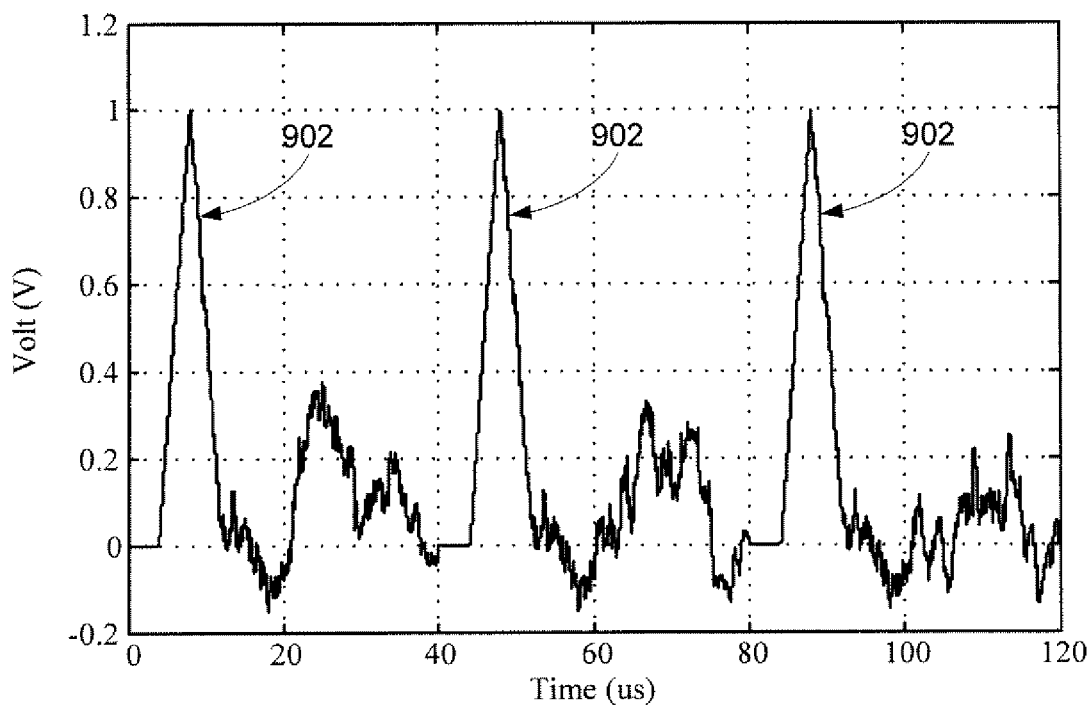

FIG. 9A current input signal x"(t) containing three frames of the IEEE 802.11a signal. FIG. 9B illustrates the delayed signal of FIG. 9A, which is the delayed output x"(t–$T_d$) of the long delay generator 106. FIG. 9C illustrates the output of multiplying the current input signal x"(t) with the delayed signal x"(t–$T_d$) by the multiplier 108. FIG. 9D illustrates the correlation data generated by integrating the output of the multiplier 108 with the integrator 110. It will be appreciated that the correlation data of FIG. 9D is almost identical that that provided by FIG. 8D. Indeed, as shown in FIG. 9D, each frame has one high peak 802. Accordingly, by setting a threshold value of around 0.6V, a signature of having one peak with 4.0 usec delay may be acquired, and 802.11a signal may be identified based upon the signature.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for analog auto-correlation, comprising:
providing an analog delayed signal, wherein the analog delayed signal lags an analog current input signal by a predetermined time delay, wherein providing the analog delayed signal comprises:
digitizing an analog original input signal associated with the analog current input signal,
storing the digitized original input signal in a first memory location of a memory element having a plurality of memory locations,
shifting the digitized original input signal in the first memory location to one or more second memory locations, wherein each second memory location is associated with a time delay, and
regenerating the analog delayed signal from one of the one or more second memory locations;
correlating the analog current input signal with the analog delayed signal to generate correlation data; and
detecting a signal type based upon the correlation data matching a signature of the signal type, wherein the signature is associated with the predetermined time delay.

2. The method of claim 1, wherein a clock speed of the memory element determines a minimum achievable delay step, and wherein a size of the memory element determines a maximum achievable delay step.

3. The method of claim 1, wherein the memory element is a shift register bank, wherein the plurality of memory locations includes registers of the shift register bank.

4. The method of claim 1, further comprising regenerating the analog current input signal from the first memory location.

5. The method of claim 1, wherein shifting the digitized original input signal includes shifting the digitized original input signal in the first memory element to one or more second memory locations based upon one or more clock edges.

6. The method of claim 1, wherein the analog original input signal is obtained by:

receiving radio frequency (RF) signals by an antenna; and
filtering the received RF signals by a tuner to obtain the analog original input signal.

7. The method of claim 6, wherein filtering the received RF signals comprises down-converting the received RF signals.

8. The method of claim 1, wherein correlating the analog current input signal with the analog delayed signal to generate correlation data includes:
digitizing the correlation data, wherein the signal type is detected based upon the digitized correlation data corresponding to the signature of the signal type.

9. The method of claim 1, wherein correlating the analog current input signal with the analog delayed signal to generate correlation data includes:
multiplying the analog current input signal by the analog delayed signal to generate a multiplied output; and
integrating the multiplied output to generate the correlation data.

10. The method of claim 1, wherein the signature is further associated with a predetermined number of peaks within the correlation data that exceed at least one threshold.

11. A system for analog auto-correlation, comprising:
a delay generator that provides an analog delayed signal, wherein the analog delayed signal lags an analog current input signal by a predetermined time delay, wherein the delay generator includes:
an analog-to-digital converter (ADC) that digitizes a currently received analog input signal to generate a digitized input signal,
a memory element having a plurality of memory locations, wherein the digitized input signal is stored a first memory location of the plurality of memory locations, wherein the digitized input signal is shifted from the first memory location to one or more second memory locations, wherein each second memory location is associated with a time delay,
addressing circuitry for selecting one of the one or more second memory locations, and
a first digital-to-analog converter (DAC) that regenerates the analog delayed signal from the selected one of the one or more second memory locations;
a multiplier that multiplies the analog delayed signal with the analog current input signal to generate a multiplied output;
an integrator that integrates the multiplied output to generate correlation data; and
a Medium Access Control (MAC) module that detects a signal type based upon the correlation data matching a signature of the signal type, wherein the signature is associated with the predetermined time delay.

12. The system of claim 11, wherein a clock speed of the memory element determines a minimum achievable delay step, and wherein a size of the memory element determines a maximum achievable delay step.

13. The system of claim 11, further comprising an analog-to-digital converter that digitizes the correlation data, wherein the Medium Access Control (MAC) module detects the signal type based upon the digitized correlation data matching the signature of the signal type.

14. The system of claim 11, wherein the signature is further associated with a predetermined number of peaks within the correlation data that exceed at least one threshold.

15. The system of claim 11, wherein the memory element is a shift register bank, wherein the plurality of memory locations includes registers of the shift register bank.

16. The system of claim 11, further comprising a second digital-to-analog converter (DAC) that regenerates the analog current input signal from the first memory location.

17. The system of claim 11, wherein the digitized input signal in the first memory is shifted to one or more second memory locations based upon one or more clock edges.

18. The system of claim 11, further comprising:
an antenna that receives radio frequency (RF) signals; and
a tuner that filters the received RF signals to obtain the analog original input signal.

19. The system of claim 18, wherein the tuner down-converts the received RF signals.

20. A method for analog auto-correlation, comprising:
providing an analog delayed signal, wherein the analog delayed signal lags an analog current input signal by a predetermined time delay, wherein providing the analog delayed signal comprises:
digitizing analog original input signals to generate a plurality of digitized input signals,
providing random access memory (RAM) having a plurality of rows,
selecting a first row of the plurality of rows in a first time period and at least one second row of the plurality of rows in a second time period subsequent to the first time period, wherein a first digitized input signal of the plurality of digitized input signals is stored in the first row and a second digitized input signal of the plurality of digitized input signals is stored in the second row, wherein the second row is associated with a time delay from the first row, and
regenerating the analog delayed signal from the second row of RAM;
correlating the analog current input signal with the analog delayed signal to generate correlation data; and
detecting a signal type based upon the correlation data matching a signature of the signal type, wherein the signature is associated with the predetermined time delay.

21. The method of claim 20, wherein the signature is further associated with a predetermined number of peaks within the correlation data that exceed at least one threshold.

22. The method of claim 20, wherein correlating the analog current input signal with the analog delayed signal to generate correlation data includes:
multiplying the analog current input signal by the analog delayed signal to generate a multiplied output; and
integrating the multiplied output to generate the correlation data.

23. The method of claim 20, wherein correlating the analog current input signal with the analog delayed signal to generate correlation data includes:
digitizing the correlation data, wherein the signal type is detected based upon the digitized correlation data corresponding to the signature of the signal type.

24. The method of claim 20, wherein a clock speed of the RAM determines a minimum achievable delay step, and wherein a size of the RAM determines a maximum achievable delay step.

25. The method of claim 20, further comprising regenerating the analog current input signal from the first row of RAM.

26. A system for analog auto-correlation, comprising:
a delay generator that provides an analog delayed signal, wherein the analog delayed signal lags an analog current input signal by a predetermined time delay, wherein the delay generator includes:

an analog-to-digital converter (ADC) that digitizes analog original input signals to generate a plurality of digitized input signals, a random access memory (RAM) having a plurality of rows, a memory controller for selecting a first row of the plurality of rows in a first time period and at least one second row of the plurality of rows in a second time period subsequent to the first time period, wherein a first digitized input signal of the plurality of input signals is stored in the first row and a second digitized input signal of the plurality of signals is stored in the second row, wherein the second row is associated with a time delay from the first row, and a first digital-to-analog converter (DAC) that regenerates the analog delayed signal from the second row of RAM;

a multiplier that multiplies the analog delayed signal with the analog current input signal to generate a multiplied output;

an integrator that integrates the multiplied output to generate correlation data; and a Medium Access Control (MAC) module that detects a signal type based upon the correlation data matching a signature of the signal type, wherein the signature is associated with the predetermined time delay.

27. The system of claim 26, wherein the signature is further associated with a predetermined number of peaks within the correlation data that exceed at least one threshold.

28. The system of claim 26, further comprising an analog-to-digital converter that digitizes the correlation data, wherein the Medium Access Control (MAC) module detects the signal type based upon the digitized correlation data matching the signature of the signal type.

29. The system of claim 26, wherein a clock speed of the RAM determines a minimum achievable delay step, and wherein a size of the RAM determines a maximum achievable delay step.

30. The system of claim 26, further comprising a second digital-to-analog converter (DAC) that regenerates the analog current input signal from the first row of RAM.

* * * * *